(12) United States Patent
Weir et al.

(10) Patent No.: US 8,655,714 B2
(45) Date of Patent: Feb. 18, 2014

(54) AUTOMATIC TIME-ZONE SENSITIVE SCHEDULING

(75) Inventors: Robert C. Weir, Westford, MA (US); Maureen Elizabeth Kraft, Hudson, MA (US); Raj Heda, Malden, MA (US); Diane Weir, Westford, MA (US); Elizabeth Paulsen Sawyer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/965,976

(22) Filed: Dec. 28, 2007

(65) Prior Publication Data

US 2009/0168609 A1 Jul. 2, 2009

(51) Int. Cl.
*G06Q 10/00* (2012.01)
(52) U.S. Cl.
USPC ...................................... 705/9; 705/7; 705/8
(58) Field of Classification Search
USPC ........................................ 705/7, 8, 9
See application file for complete search history.

(56) References Cited

U.S. PATENT DOCUMENTS

| | | | |
|---|---|---|---|
| 6,016,478 A * | 1/2000 | Zhang et al. ................. | 705/7.19 |
| 6,198,696 B1 | 3/2001 | Korpi et al. | |
| 6,647,370 B1 | 11/2003 | Fu et al. | |
| 6,831,970 B1 | 12/2004 | Awada et al. | |
| 6,950,662 B2 | 9/2005 | Kumar | |
| 7,082,402 B2 | 7/2006 | Conmy et al. | |
| 7,188,073 B1 | 3/2007 | Tam et al. | |
| 7,774,224 B2 * | 8/2010 | Xiao et al. ................... | 705/7.18 |
| 2001/0014867 A1* | 8/2001 | Conmy .......................... | 705/9 |
| 2002/0038234 A1* | 3/2002 | Fu et al. ........................ | 705/8 |
| 2005/0021636 A1 | 1/2005 | Kumar | |
| 2006/0136121 A1* | 6/2006 | Eisen ........................... | 701/200 |

OTHER PUBLICATIONS http://www.novell.com/coolsolutions/tip/9559.html.

* cited by examiner

*Primary Examiner* — Nga B. Nguyen
(74) *Attorney, Agent, or Firm* — David A. Dagg (57) ABSTRACT

A system that enables a user to indicate time zones in their electronic calendar for corresponding time periods in the future, and that makes the future time zone information it collects available for scheduling purposes, so that free time can be correctly determined even for frequently traveling users. The disclosed system further automatically provides indications to the user when input future free time information creates local times for previously scheduled calendar events that are outside of the user's regular working hours.

18 Claims, 6 Drawing Sheets

Time Zone Override

From: 7/1/2006 6:00AM — 152

To: 7/5/2006 5:00PM — 154

Location: London, UK — 156

Calculated Time Zone = GMT+0 — 158

OK   Cancel

AUTOMATIC TIME-ZONE SENSITIVE SCHEDULING

FIELD OF THE INVENTION

The disclosed system relates generally to electronic calendaring, and more specifically to a method and system for automatic time-zone sensitive scheduling in an electronic calendaring system.

BACKGROUND OF THE INVENTION

As it is generally known, electronic calendaring systems are becoming more and more commonly used among computer users. Existing calendaring tools automatically check the electronic calendars of team members for open time slots, propose alternative meeting times, schedule team meetings or appointments and notify/remind users of scheduled events through electronic mail messages.

When using an electronic calendar to schedule a meeting among multiple participants spread out over multiple time-zones, it would be desirable for the calendaring system to select a meeting time that works well for all participants, or at least a majority of them. However, while existing electronic calendars include a single time zone application setting, it cannot be selectively overridden on a per-day, or per-time basis. In addition, some existing calendaring systems completely ignore a participant's time zone when determining whether they are available for a meeting. Further, although Microsoft Windows® and other operating systems have a user setting for a current time zone, this setting merely enables the user to indicate the time zone they are currently in. For example, a user of such a feature in New York can indicate that they are currently using Eastern Standard Time (EST). However, such existing systems are often ineffective, and inflexible, especially for scheduling frequent business travelers, since they do not allow time zones to be specified into the future.

To address this problem, users have been forced to manually enter place-holder appointments to prevent others from scheduling meetings at times that they will be unavailable because of the time zone they will be in. For example, when a user whose primary office is on the East Coast travels to the West Coast, they might schedule "fake" place-holder appointments in the early morning (i.e. Eastern Standard Time), in order to prevent others from scheduling meetings before the start of their work day while they are on Pacific Standard Time (PST). Such manual procedures currently used to address this problem are laborious and time consuming.

Some existing systems provide automatic current location detection, via Internet Protocol (IP) address analysis or other means, in order to determine where the user is located at the present time. These systems allow the user's schedule to indicate which time zone the user is in at the present time. However, especially for frequently traveling users, location detection systems are insufficient, since they cannot accurately determine the time zone a user will be in at a point in the future, e.g. at times being considered for scheduling a meeting.

U.S. Pat. No. 6,647,370 includes an enhanced personal information manager (PIM) that allows the user to specify three "clocks" for the user interface display: 1) the "home" time zone (where the user most often is), 2) the "local" time zone (where the user is at the present time) and 3) a "remote" time zone. The system also converts time zones and displays them to the user, receives GPS (Global Positioning System) signals to detect changes in the user's local time zone, and converts the user's calendar display automatically. However, this system includes no group scheduling features, or any techniques for specifying the location or time-zone that a specific user will be in at a specific future time, and is not granular enough to support scheduling on an hour by hour basis in a future time zone.

It would accordingly be desirable to have a new system that enables a user to indicate time zones in their electronic calendar for corresponding time periods in the future (e.g. next week the user will be in Dublin, the week after in Las Vegas, etc.). Such a system would further make the future time zone information it collects available for scheduling purposes, in order to correctly identify free times even for frequently traveling users.

SUMMARY OF THE INVENTION

To address the above described and other shortcomings of previous techniques, a new method and system are disclosed for automatic time-zone sensitive scheduling in an electronic calendaring system. The disclosed system inputs future time zone information for specific users, and the future time zone information is used to determine individual user availability for meetings and other schedulable calendar events. In a first embodiment, the disclosed system generates a user interface object that inputs future time zone information from a local user. The future time zone user interface object of the disclosed system enhances an electronic calendar system's graphical user interface to allow a user to specify a location for a user-indicated future time period, e.g. multiple days, an individual day, or a portion of a day. Input location information for a user may be translated into a corresponding time zone, e.g. through a table look-up operation or the like. Alternatively, the future time zone user interface object may be generated to allow the user to directly enter a time zone for a specified future time period. In addition, the time zone for a future time period may be automatically adjusted according to national rules for daylight savings time, based on the user's indicated location for that time period.

A default time zone may also be maintained as a constant for the user, representing the user's main location, and automatically set or configured by the system or application, or configured by the user. Through operation of the disclosed system, the default time zone may be overridden by the user's input future time zone information for any particular future block of time, e.g. to reflect the user's travel plans.

In an alternative embodiment, or as an additional feature, the input future time zone information is automatically transferred to and received by the electronic calendar of the user from a separate travel reservation system, e.g. based on online travel reservation information for that user.

In another aspect of the disclosed system, a free-time search performed by the electronic calendar for scheduling calendar events, such as meetings, appointments, etc., operates at least in part based on the indicated future time zones of the user (e.g. a meeting invitee) for calendar times being searched. For example, a free-time search may be initiated when a scheduler process or the like attempts to find times at which a requested meeting could be scheduled, by collecting indications of the free-time of all listed invitees, in order to find and/or suggest which timeslots are free for all or a sufficient/threshold number of invitees. Similarly, a free-time search may be initiated when scheduling a meeting in order to determine if a user is available at a specific time to attend a meeting. The free-time search of the disclosed system is sensitive to participants' future time-zones, and uses the participants' future time-zone indications to permit, schedule, list and/or suggest times for future calendar events, such that the times are within the "normal" (e.g. default or user configured) working hours of all or most of the participants, even when such future time-zone indications are considered.

When a request for a user's free-time is received, the disclosed system returns time periods that 1) are not already scheduled for that user, e.g. for previously accepted meetings, appointments, and/or other calendar events, and that 2) are within the regular working hours for the user in the indicated future time zone and/or location the user will be in at that time. In one embodiment of the disclosed system, each user is associated with a user profile listing which hours they are available and able to work (their "regular working hours"). This default profile may indicate different working hours according to specific days of the week. By taking into consideration the future time zones of the user, the disclosed system will, for example, advantageously avoid scheduling events outside of the user's regular working hours (e.g. will not schedule a meeting at 8 a.m. Eastern Standard Time (EST) for a given day if a future time zone indication for the user indicates that they will be in the Pacific Time Zone (PT) at that time, in the case where the user's local time (5 a.m.) would be outside of the user's regular working hours as indicated in the user's profile).

In another aspect of the disclosed system, upon setting or updating future time zone information for a user, the newly input future time zone information is used to automatically check existing calendar events during the affected future time periods to determine whether the new future time zone information causes any previously scheduled events (meetings, appointments, etc.), to fall outside the regular working hours of the user. Accordingly, if a user has already accepted a meeting at 8 a.m. EST on a given day, and they later schedule travel to the Pacific Time Zone (PT) on that day, when their future time zone information is updated to reflect the trip, the disclosed system detects that the previously scheduled meeting is now outside of regular working hours, and provides an indication of the conflict to the user (e.g. within the calendar user interface representing the day of the meeting, by way of an email message, etc.). In addition, a user interface object may be generated that lists all scheduled events that are caused to fall outside of regular working hours by the newly input future time zone information.

Thus there is disclosed a new system that enables a user to indicate time zones in their electronic calendar for corresponding time periods in the future, and that makes the future time zone information it collects available for scheduling purposes, so that free time can be correctly determined even for frequently traveling users. The disclosed system further automatically informs the user when input future free time information creates actual times for previously scheduled calendar events that are outside of the user's regular working hours.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
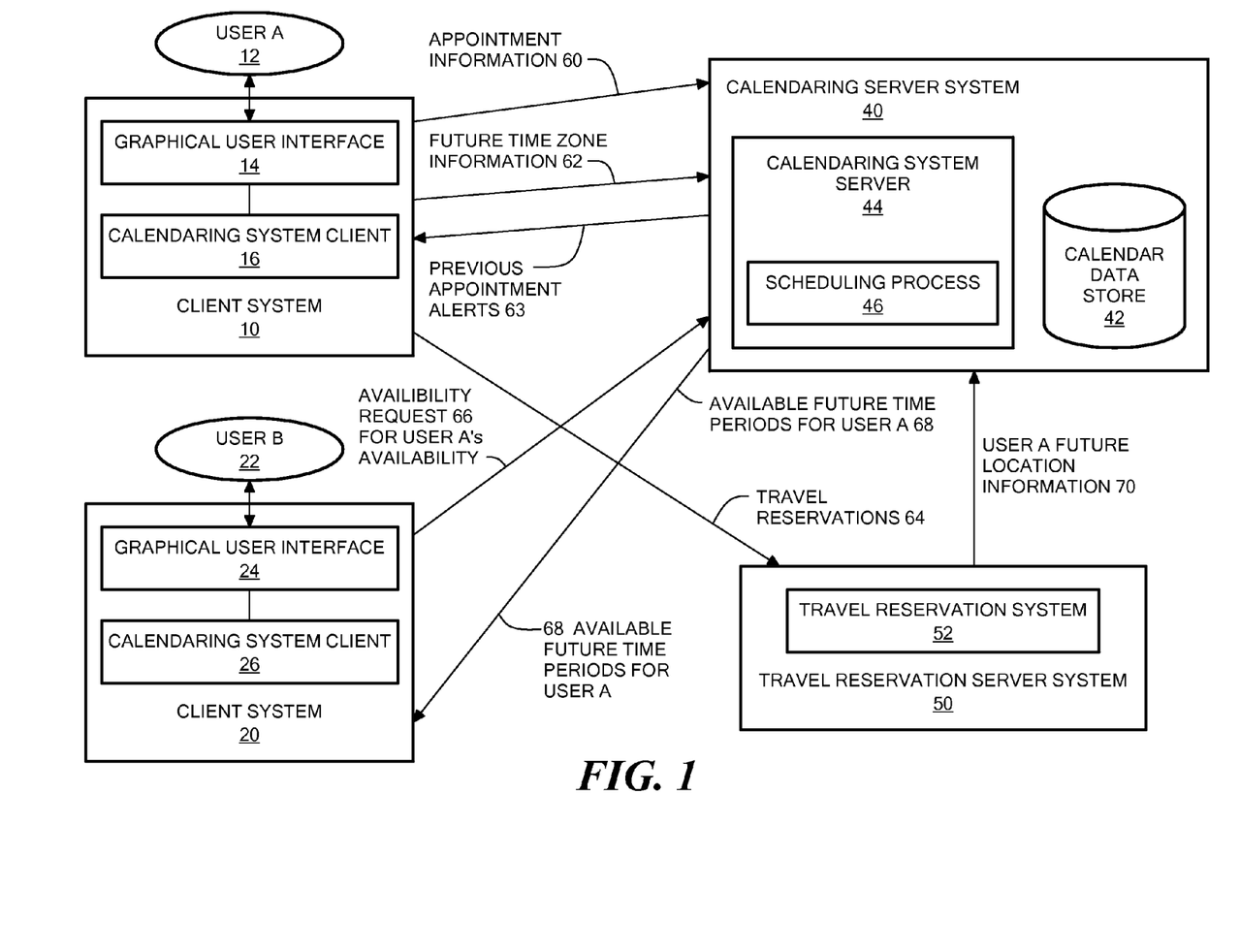
FIG. 1 is a block diagram showing hardware and software components in an illustrative embodiment.

FIG. 1 is a block diagram showing hardware and software components in an illustrative embodiment. As shown in FIG. 1, a Client System 10 includes a Calendaring System Client 16 that generates a Graphical User Interface 14 for User A 12, and a Client System 20 includes a Calendaring System Client 26 that generates a Graphical User Interface 24 for User B 22. A Calendaring Server System 40 is further shown in FIG. 1, including a Calendaring System Server 44 and a Calendar Data Store 42. The Calendaring System Server 44 is shown including a Scheduling Process 46. The Calendar Data Store 42 may be embodied as any specific type of data store, such as, for example, an LDAP (Lightweight Directory Access Protocol) structured data store. A Travel Reservation Server System 50 is also shown including a Travel Reservation System 52.

During operation of the embodiment shown in FIG. 1, User A 12 enters or otherwise indicates approval of calendar events to be included in their electronic calendar through the Graphical User Interface 14. Appointment Information 60 describing such calendar events is then conveyed by Calendaring System Client 16 to the Calendaring System Server 44. For example, when User A 12 schedules a meeting, User A 12 may enter the time, date, and time zone of the meeting, as well as potentially other information related to the meeting (e.g. agenda, notes, etc.) through the Graphical User Interface 14, and that calendar event information may then be published by the Calendaring System Client 16 to the Calendaring System Server 44 as part of a periodic update process or the like. The Calendaring System Server 44 then stores the received Appointment Information 60 into the Calendar Data Store 42.

Further in the embodiment of FIG. 1, the User A 12 also enters or otherwise indicates future time zone information through the Graphical User Interface 14, indicating a specific future time period during which User A 12 will be located in a specified time zone. For example, in the case where User A 12 has a default time zone of Eastern Time (ET) (e.g. due to their having their main office in Boston), and determines that he or she will be traveling to a location in a different time zone, (e.g. a location in the Pacific Time Zone (PT), such as Los Angeles, San Francisco etc.) for a period of time in the future (e.g. for a half day business meeting, three day conference, etc.), User A 12 enters future time zone information indicating the specific time zone they will be in (e.g. Pacific Time Zone (PT)) and the specific future time period during which they will be in that time zone. For example, in one embodiment User A 12 indicates the future time zone they will be in during a future time period by entering the specific location to which they will be traveling along with the time period during which they will be in that location. The future time zone information entered by the User A 12 into the Graphical User Interface 14 is then conveyed by the Calendaring System Client 16 to the Calendaring System Server 44. The Calendaring System Server 44 stores the future time zone information it receives in the Calendar Data Store 42. For example, if the Future Time Zone Information 62 indicates that User A 12 will be in the Pacific Time Zone (PT) on a specific day, days, or portion of a day, the Calendaring System Server 44 stores an indication of the Pacific Time Zone (PT) in association with a data record or the like representing that specific time period within the Calendar Data Store 42.

Further in the embodiment of FIG. 1, the Calendaring System Server 44 operates to check previously made appointments associated with User A 12's calendar in the Calendar Data Store 42 in response to the Future Time Zone Information 62, in order to determine whether the Future Time Zone Information 62 has caused any previously made appointments to be moved outside of regular working hours. For example, if User A 12 has previously scheduled a meeting at 8:00 AM EST on a specific future date (e.g. and conveyed a description of that appointment to the Calendaring System Server 44 in Appointment Information 60), and then subsequently Future Time Zone Information 62 is conveyed to the Calendaring System Server 44 indicating that on that specific future date, the user will be at a location in the Pacific Time Zone (PT), the Calendaring System Server 44 will determine that the effective local time for User A 12 will be 5:00 AM PST at the time of the meeting. The Calendaring System Server 44 will then compare the determined effective local time of the meeting with User A 12's regular working hours, to determine whether the meeting is still within User1 12's regular work day. In the likely event that 5:00 AM is not within User A 12's regular working hours (e.g. 8:00 AM to 6:00 PM), the Calendaring System Server 44 will issue an alert or notification to User A 12, shown for purposes of illustration in FIG. 1 by Previous Appointment Alerts 63. An alert generated by the disclosed system to indicate that a previously scheduled calendar event has become outside of regular working hours for a user as a result of received future time zone information may be any specific type of alert, such as, for example, an electronic mail message automatically sent to User A 12 and identifying the affected calendar event, a visible annotation in the Graphical User Interface 14 (e.g. within a user interface object displaying all conflicts for User A 12, including all calendar events falling outside of regular working hours due to scheduling performed in a different time zone, and/or User A 12's schedule for the day of the affected calendar event), an automatically generated instant message, an automatically generated call to User A 12's cell phone, etc.

As further shown in FIG. 1, User A 12 may also make travel reservations, such as flight reservations, hotel reservations, rental car reservations, etc., on Client System 10 (e.g. through one or more forms or the like provided through a Web Browser or the like executing on Client System 10), which are then conveyed as Travel Reservations 64 to a Travel Reservation System 52 executing on a remote Travel Reservation Server System 50. In one embodiment of the disclosed system, future location information regarding User A 12 is then extracted or derived from the Travel Reservations 64, and conveyed to the Calendaring System Server 44, as shown by User A Future Location Information 70. For example, if User A 12 were to make travel reservations for a week long business trip from his or her main office in Boston to Los Angeles, the User A Future Location Information 70 would indicate that User A 12 will be in Los Angeles during that specific week in the future. Upon receipt of the User A Future Location Information 70, the Calendaring System Process 46 determines the time zone for User A 12's location during the scheduled trip (e.g. the Pacific Time Zone), and stores an indication of that time zone in association with the representation of the week during which User A 12 will be in Los Angeles in the Calendar Data Store 42. Conversion from a location to a corresponding time zone may, for example, be performed using a table look up operation or the like. Similarly, the Future Time Zone Information 62 may also represent a future time zone by the location User A 12 will be in, and a table look up performed by Calendaring System 44 to determine the time zone for that location. As an alternative to providing the user's future location from the Travel Reservation System 52 to the Calendaring System Server 44, the actual future time zone for the future location may be determined by the Travel Reservation System and sent to the Calendaring System Server 44.

Upon receipt of User A Future Location Information 70, the Calendaring System Server 44 checks previously made appointments for User A 12, in order to determine whether any previously made appointments fall outside of User A 12's regular working hours when User A Future Location Information 70 is considered. If so, then appropriate Previous Appointment Alerts 63 are generated, as described above.

As further shown in FIG. 1, User B 22 may cause an Availability Request 66 for User A 12's availability to be conveyed from Calendaring System Client 26 to Calendaring System Server 44. For example, if User B 22 is scheduling a meeting for which User A 12 is an invitee, then User B 22 may request, for example through the Graphical User Interface 24, a listing of User A 12's free time periods, as indicated by information stored in the Calendar Data Store 42 representing User A 12's schedule. Upon receipt of the Availability Request 66, Calendaring System Server 44 will generate a listing of free time periods for User A 12, based on 1) existing appointments for User A 12, and 2) future time zone information for User A 12 stored in the Calendar Data Store 42. The Calendaring System Server 44 assembles a list of future time periods in User A 12's schedule during which User A 12 has no existing appointments scheduled, and that are within User A 12's regular working hours considering the future time zone information for User A 12. Accordingly, the Calendaring System Server 44 will not return an available time period from 8:00 AM to 9:00 AM EST for a day during which User A 12 will be in the Pacific Time Zone. User A 12's free time periods are conveyed by the Calendaring System Server 44 to the Calendaring System Client 26, as shown in FIG. 1 by Available Future Time Periods for User A 68. The regular working hours for a specific user may be determined in any appropriate way. For example, regular working hours for each user may be stored in the Calendar Data Store 42, and/or obtained from Personal Information Manager (PIM) configuration data or the like stored within the user's client system and/or on a central server system. The regular working hours for a given user may be set by a default corporate policy (e.g. 8:00 AM to 5:00 PM), or custom configured by the user, and may be different for different days of the week. In addition, the disclosed system may be embodied to determine regular working hours for a user on a per day basis in response to the future time zone information stored for that user. Such an embodiment may, for example, determine that the user's work week is Monday through Friday for a future time period during which the user will be located in time zones in North America, and accordingly not provide indications of free time on Saturday or Sunday. Similarly, such an embodiment determines that the user's work week is from Sunday through Thursday for a future time period during which the user will be located in time zones in Israel, and accordingly only return indications of free time during those days of the week.

The Client Systems 10 and 20 of FIG. 1 may be any specific type of a computer system or intelligent electronic device, such as a desktop, laptop, or palmtop computer system, or a personal digital assistant, cell phone, or other electronic device. The Client Systems 10 and 20 each include or control display devices capable of displaying a graphical user interface (e.g. including Graphical User Interface 14 and Graphical User Interface 24) to a local user (e.g. User A 12 and User B 22), such as a liquid crystal display (LCD), cathode ray tube (CRT), interferometric modulator display (IMOD), light emitting diode (LED), or the like.

Those skilled in the art will further recognize that the Calendaring System Clients 16 and 26, Calendaring System Server 44, and Travel Reservation System 52 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 10 and 20 and Server Systems 40 and 50 of FIG. 1 may each include one or more processors, and program storage, such as memory, for storing program code executable on such processors, as well as input/output devices and/or interfaces. In the example of FIG. 1, the Client Systems 10 and 20 and Server Systems 40 and 50 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration only two client systems and respective users are shown in FIG. 1, the disclosed system is not limited to any specific number of users and/or client systems. Moreover, while certain functions are described as being performed in the calendaring system clients 16 and 26, and in the Calendaring System Server 44, the disclosed system is not limited to any specific configuration or implementation in that regard. Accordingly, operations described as occurring in the clients 16 and 26 may alternatively be performed in the Calendaring System Server 44, and vice versa. In addition, while the illustrative embodiment of FIG. 1 is implemented in a client-server architecture, the disclosed system is not limited to such an embodiment, and may alternatively be embodied using any other specific type of system architecture that may be appropriate and or advantageous for a given implementation.

Figure 2:
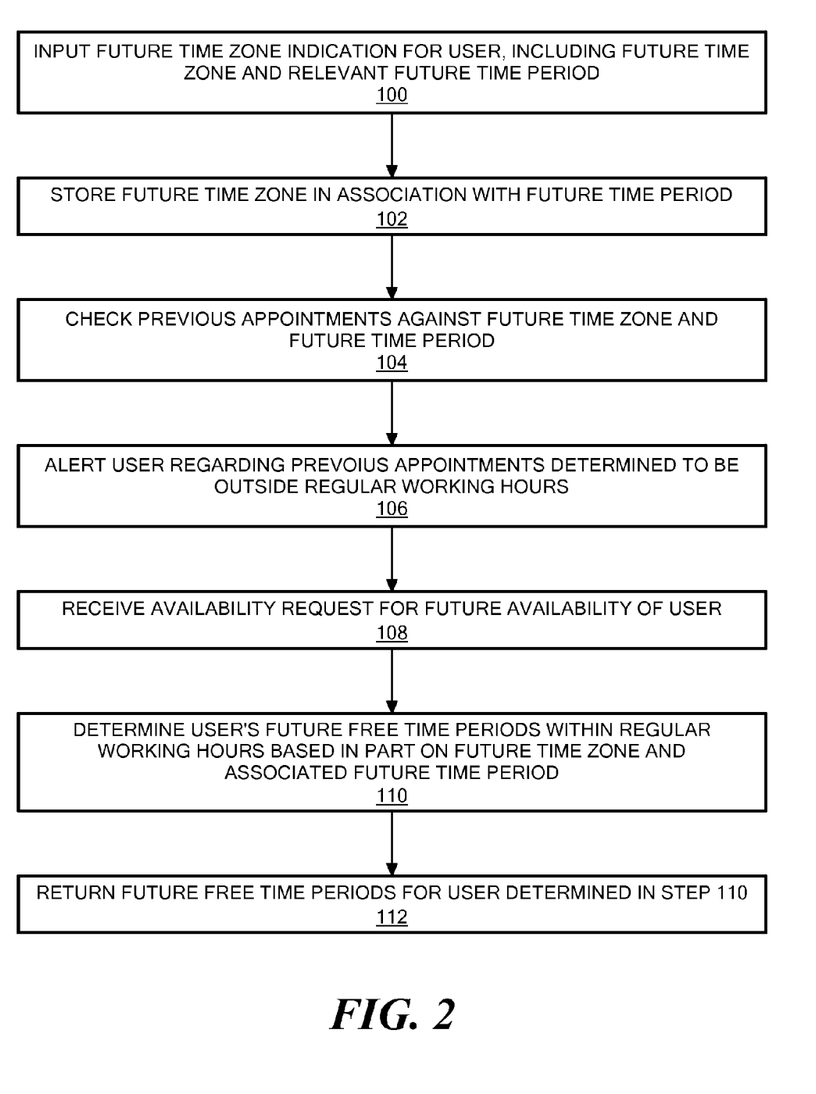
FIG. 2 is a flow chart showing steps performed during operation of an illustrative embodiment.

FIG. 2 is a flow chart showing steps performed during operation of an illustrative embodiment. At step 100, the disclosed system inputs a future time zone indication for a user, including a future time zone (or location) and a future time period during which the user will be located in the future time zone. At step 102, the disclosed system retrievably stores the future time zone in association with the future time period. At step 104, the disclosed system checks previously scheduled appointments of the user against the future time zone and future time period stored at step 102 to determine if any previously scheduled appointments have been made to fall outside the regular working hours of the user by the future time zone and future time period stored at step 102. If any previously scheduled appointments have become outside the regular working hours of the user as a result of the future time zone and future time period stored at step 102, the disclosed system informs the user that those previously scheduled appointments using one or more alerts (e.g. annotations in the electronic calendar user interface, automatic email messages, automatic instant messages, automatic cell phone calls, etc.) at step 106.

At step 108, an availability request is received to determine the future availability of the user. For example, an example of an availability request is a request issued by another user to determine whether the user is available to attend a meeting at one or more specified times. Another example of an availability request is a request issued by another user to determine the time periods during which the user is free within the upcoming week.

At step 110, the disclosed system responds to the availability request received at step 108 by determining the user's free time periods, within regular working hours, based at least in part on the future time zone and associated time period stored at step 102. At step 112, the disclosed system returns the user's free time periods as determined at step 110.

Figure 3:
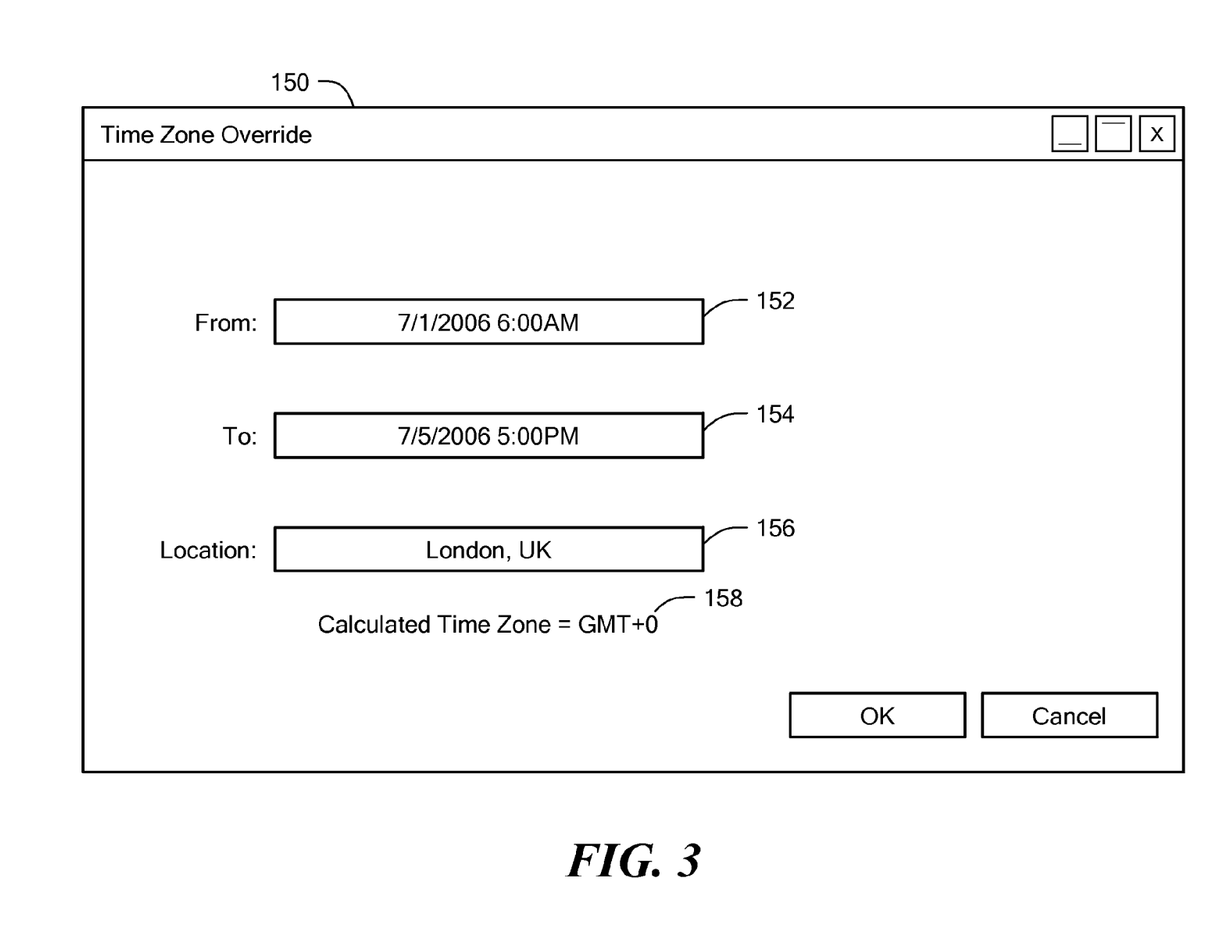
FIG. 3 is a simplified screen shot showing a user interface object generated during operation of an illustrative embodiment to enable a user to input time zone information for a future date or dates.

FIG. 3 is a simplified screen shot showing a user interface object generated during operation of an illustrative embodiment to enable a user to input time zone information for a future time period. As shown in FIG. 3, a user interface object 150, as may be generated as part of the Graphical User Interface 14 shown in FIG. 1, includes a field 152 into which User A 12 can enter a start time and date for a future time period. Field 154 inputs an end time and date for the future time period, and field 156 inputs a location that User A 12 will be in during the future time period. At 158 the user interface object 150 displays the calculated future time zone associated with the location entered into field 156. Future time zone information received by the Calendaring System Client 16 is conveyed to the Calendaring System Server 44 to be stored in the Calendar Data Store 42.

Figure 4:
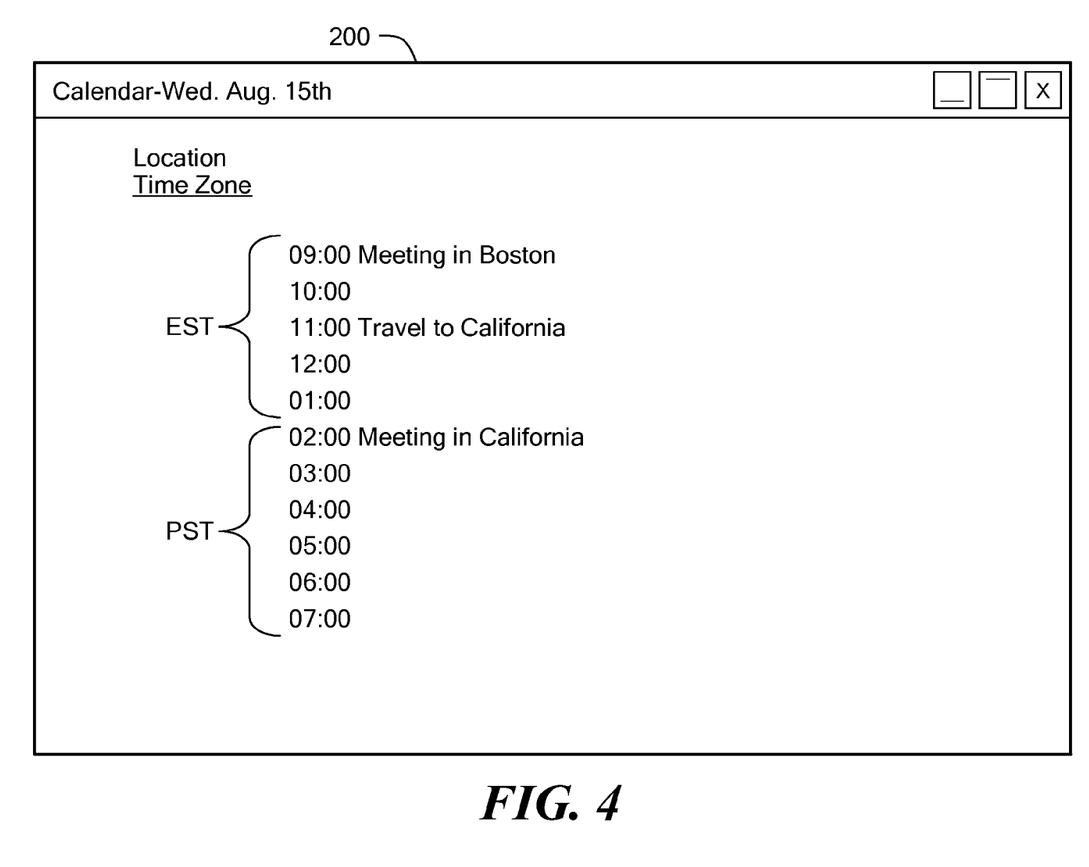
FIG. 4 is a simplified screen shot showing a user interface object generated during operation of an illustrative embodiment to display time zone information to a user.

FIG. 4 is a simplified screen shot showing a user interface display object generated during operation of an illustrative embodiment to display time zone information to a user. As shown in FIG. 4, a user interface object 200 (e.g. as may be displayed to User A 12 of FIG. 1 in Graphical User Interface 14) displays calendar event information for a day in the user's electronic calendar. In the example of FIG. 4, the display object 200 indicates that the user will be in a meeting in Boston at 9:00 AM EST, and then begins traveling to California at 11:00 AM. The next calendar event shown in the display object 200 is a meeting in California beginning at 2:00 PM PST.

The display format shown in the user interface display object 200 of FIG. 4, is only given for purposes of illustration, and the disclosed system is not limited to such a layout. Alternative user interface display layouts showing a portion of a user's calendar and the time zones the user will be in for specific time periods may accordingly be provided, such as showing times in different time zones in different columns of the display. Other embodiments of the disclosed system may provide visually distinct displays of time periods during which the user will be located in different time zones, e.g. by using different outlining, highlighting, colors, etc. for different future time zones.

Figure 5:
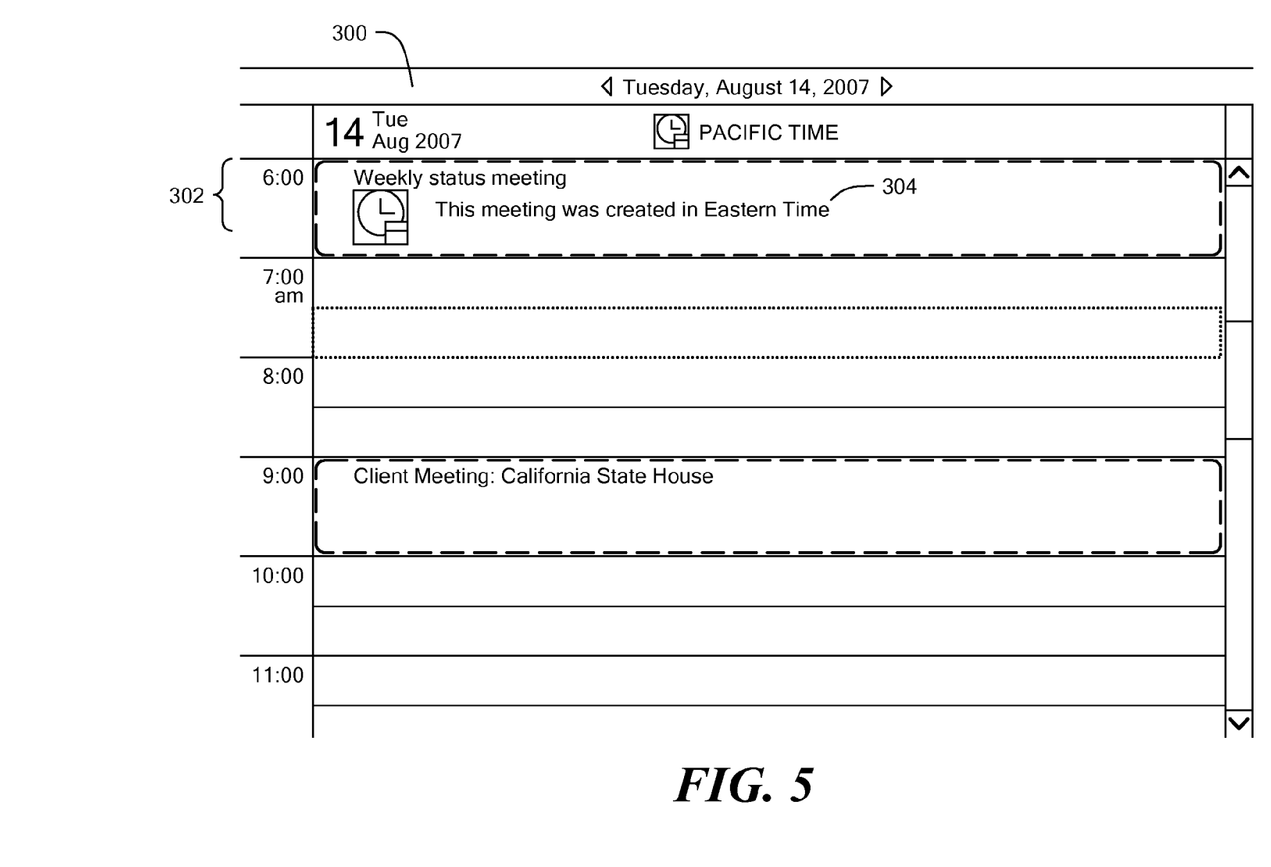
FIG. 5 is a simplified screen shot showing a user interface object displaying a user's schedule for a portion of a day and including a visual indication of a previously created meeting that is now in conflict with the user's regular business hours as a result of subsequently entered time zone information.

FIG. 5 is a simplified screen shot showing a user interface object displaying a user's schedule for a portion of a day and including a visual indication of a previously created meeting that is now in conflict with the user's regular business hours as a result of subsequently entered time zone information. As shown in FIG. 5, a user interface display object 300 (e.g. as may be provided to User A 12 in Graphical User Interface 14)

includes an entry 302 for a calendar event consisting of a weekly status meeting. Because future time zone information entered by the user has caused the calendar event for calendar entry 302 to be outside of regular working hours, a visual alert 304 is displayed to the user, consisting for purposes of illustration as the text "This meeting was created in Eastern Time". For example, the weekly status meeting for entry 302 may have originally be entered at 9:00 AM EST, e.g. because the user's default time zone is Eastern Time (ET). Subsequently, the user arranged a trip to a location in the Pacific Time Zone (PT) for a future time period including the day of the meeting (e.g. Aug. 14, 2007), and future time zone information describing the trip was entered. At that point, the disclosed system checked existing appointments for the user, including the weekly status meeting for Aug. 14, 2007, and determined that the future time zone information caused the weekly status meeting to be outside regular working hours (e.g. 8:00 AM to 5:00 PM), since the time of the previously scheduled meeting is now 6:00 AM in the time zone that the user will be located in on Aug. 14, 2007. Based on that determination, the disclosed system generated an alert (e.g. text 304) to bring to the user's attention the fact that the meeting will occur outside of regular working hours in the user's time zone on the day of the meeting.

While for purposes of illustration a text alert 304 is shown in FIG. 5, the disclosed system is not limited to such an embodiment, and may alternatively be embodied to use any specific type of alert to inform a user of a calendar event that has been caused to be outside of regular working hours by entry of future time zone information. Other examples of alerts that may provided include different visual representation of calendar entries for events that have become outside of regular working hours (e.g. displaying such calendar entries in red, etc), automatically generated email messages, instant messages, cell phone calls, etc.

Figure 6:
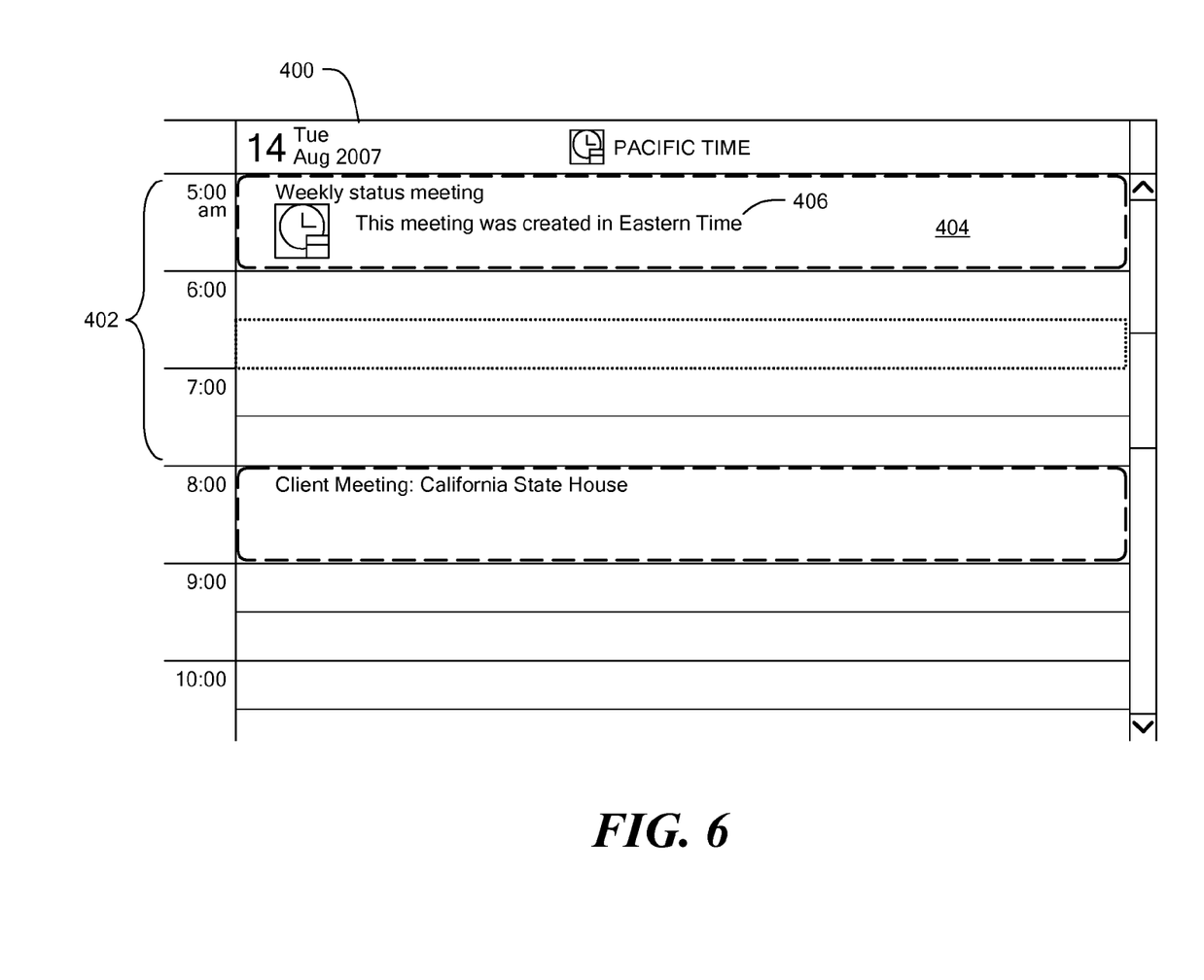
FIG. 6 is a simplified screen shot showing a user interface object displaying a user's schedule for a portion of a day and including a visual indication of hours of the day that are outside the user's regular working hours in a time zone for a future time period.

FIG. 6 is a simplified screen shot showing a user interface object displaying a user's schedule for a portion of a day and including a visual indication of hours of the day that are outside the user's regular working hours in a time zone for a future time period. As shown in FIG. 6, a user interface display object 400 includes a visually distinct display of a time range 402 (e.g. from 5:00 AM up to 8:00 AM) that is outside the regular working hours of the user. For example, in response to a determination that the previously scheduled weekly status meeting will be outside the user's regular working hours, based on future time zone information entered subsequent to the meeting being scheduled, the disclosed system may operate to shade all the times beginning with the meeting entry up until the beginning of the user's regular working hours with a predetermined color (e.g. yellow). Accordingly, the time range 402 from 5:00 AM to 8:00 AM Pacific Time would be displayed in the visually distinct coloring and/or shading, bringing the fact that the weekly status meeting is no longer within the user's regular working hours to the user's attention. Thus the coloring of the time range 402 is another example of a form of alert that may be generated by an embodiment of the disclosed system. The entry 404 for the meeting itself may also include further additional visual information indicating that it now is outside the user's regular working hours, e.g. the text 406.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method, embodied in at least one computer, for automatic time-zone sensitive scheduling in an electronic calendaring system executing on said at least one computer, comprising:

inputting, by said at least one computer, a future time zone indication for a user, wherein said future time zone indication indicates a future time zone and a future time period during which said user will be located in said future time zone;

retrievably storing, by said electronic calendaring system, said future time zone in association with said future time period during which said user will be located in said future time zone in a data store within said computer, wherein said data store is associated with said electronic calendaring system;

receiving, by said at least one computer, prior to said future time period during which said user will be located in said future time zone, an availability request for future times at which said user will be available;

determining, by said at least one computer, responsive to receipt of said availability request and to said stored association between said future time zone and said future time period during which said user will be located in said future time zone, and to regular working hours for said user in the indicated future time zone, at least one future time period during which said user will be available, wherein said determining is based at least in part on said stored association between said future time zone and said future time period during which said user will be located in said future time zone, and is further based on regular working hours for said user in the indicated future time zone, wherein said future time period during which said user will be available is within said future time period during which said user will be located in said future time zone, and wherein said determining ensures that said future time period during which said user will be available is within said regular working hours for the user in the indicated future time zone; and returning, by said at least one computer, said at least one future time period during which said user is available to an originator of said request for availability of said user.

2. The method of claim 1, wherein said inputting said future time zone indication for said user further comprises generating a user interface display object through which said user enters said future time zone indication.

3. The method of claim 2, wherein said user interface object further enables said user to indicate said future time period during which said user will be located in said future time zone as a range of hours within at least one day in the future.

4. The method of claim 3, further comprising:
wherein said future time zone indication includes an indication of a location said user will be in during said future time period during which said user will be located in said future time zone; and
converting said location to said future time zone.

5. The method of claim 1, wherein said inputting said future time zone indication for said user further comprises:
receiving, from a travel reservation system, a location said user will be in during said future time period based on at least one travel reservation for said user; and
converting said location to said future time zone.

6. The method of claim 4, further comprising:
wherein said determining said at least one future time period during which said user will be available is further responsive to national rules for daylight saving time for said location said user will be in during said future time period during which said user will be located in said future time zone.

7. The method of claim 6, wherein said retrievably storing said future time zone in association with said future time period during which said user will be located in said future time zone in said data store associated with said electronic calendaring system further comprises overriding a default time zone for said user.

8. The method of claim 6, wherein said determining said at least one future time period during which said user will be available is further responsive to work week and working hours indications for said location said user will be in during said future time period during which said user will be located in said future time zone.

9. The method of claim 8, wherein said determining said at least one future time period during which said user will be available is further responsive to at least one previously scheduled calendar event for said user.

10. The method of claim 9, further comprising:
checking at least one previously existing calendar event of said user to determine whether said previously existing calendar event is caused to be outside of said regular working hours by said future time zone indication; and
responsive to a determination that said future time zone indication causes said previously existing calendar event to be outside of said regular hours, generating an alert to said user.

11. The method of claim 10, further comprising:
wherein said alert comprises an electronic mail message automatically sent to said user.

12. The method of claim 10, further comprising:
responsive to a determination that said future time zone indication causes said previously existing calendar event to be outside of said regular working hours, providing a visual indication that said previously existing calendar event is now outside of said regular working hours in a user interface display object representing said user's schedule on a future day during which said previously existing calendar event is scheduled.

13. The method of claim 12, further comprising:
generating a user interface display object listing a plurality of previously existing calendar events caused to be outside said regular working hours by said future time zone indication.

14. The method of claim 1, wherein said request for availability comprises a request for times at which said user could potentially attend a meeting.

15. The method of claim 1, wherein said originator of said request for availability of said user comprises a calendar client process.

16. The method of claim 1, further comprising:
in the event that said user is not available during a requested time period indicated in said availability request due to scheduling conflicts, returning an indication that said user is not available during said requested time period to said originator of said request for availability of said user.

17. A system comprising:
a computer readable memory having program code stored thereon, said program code operable, when executed on at least one processor communicably coupled to said memory, to cause an electronic calendaring system to provide automatic time-zone sensitive scheduling by
inputting a future time zone indication for a user, wherein said future time zone indication indicates a future time zone and a future time period during which said user will be located in said future time zone,
retrievably storing said future time zone in association with said future time period during which said user will be located in said future time zone in a data store associated with said electronic calendaring system,
receiving, prior to said future time period during which said user will be located in said future time zone, an availability request for future times at which said user will be available,
determining, responsive to receipt of said availability request and to said stored association between said future time zone and said future time period during which said user will be located in said future time zone, and to regular working hours for said user in the indicated future time zone, at least one future time period during which said user will be available, wherein said determining is based at least in part on said stored association between said future time zone and said future time period during which said user will be located in said future time zone, and is further based on regular working hours for said user in the indicated future time zone, wherein said future time period during which said user will be available is within said future time period during which said user will be located in said future time zone, and wherein said determining ensures that said future time period during which said user will be available is within said regular working hours for the user in the indicated future time zone, and returning said at least one future time period during which said user is available to an originator of said request for availability of said user.

18. A computer program product comprising:

a non-signal computer readable memory, said computer readable memory having program code executable by at least one processor stored thereon for automatic time-zone sensitive scheduling in an electronic calendaring system, said program code comprising program code for inputting a future time zone indication for a user, wherein said future time zone indication indicates a future time zone and a future time period during which said user will be located in said future time zone, program code for retrievably storing said future time zone in association with said future time period during which said user will be located in said future time zone in a data store associated with said electronic calendaring system, program code for receiving, prior to said future time period during which said user will be located in said future time zone, an availability request for future times at which said user will be available, program code for determining, responsive to receipt of said availability request and to said stored association between said future time zone and said future time period during which said user will be located in said future time zone, and to regular working hours for said user in the indicated future time zone, at least one future time period during which said user will be available, wherein said determining is based at least in part on said stored association between said future time zone and said future time period during which said user will be located in said future time zone, and is further based on regular working hours for said user in the indicated future time zone, wherein said future time period during which said user will be available is within said future time period during which said user will be located in said future time zone, and wherein said determining ensures that said future time period during which said user will be available is within said regular working hours for the user in the indicated future time zone, and program code for returning said at least one future time period during which said user is available to an originator of said request for availability of said user.

* * * * *